United States Patent
Sengupta (12)

(10) Patent No.: US 8,310,208 B2
(45) Date of Patent: Nov. 13, 2012

(54) CHARGING ALGORITHM FOR LITHIUM BATTERIES

(76) Inventor: Surajit Sengupta, Waterloo (CA)

( * ) Notice: Subject to any disclaimer, the term of this patent is extended or adjusted under 35 U.S.C. 154(b) by 286 days.

(21) Appl. No.: 12/829,362

(22) Filed: Jul. 1, 2010

(65) Prior Publication Data

US 2011/0043169 A1   Feb. 24, 2011

Related U.S. Application Data

(60) Provisional application No. 61/222,372, filed on Jul. 1, 2009.

(51) Int. Cl.
*H01M 10/44* (2006.01)
(52) U.S. Cl. ........................................ 320/137; 320/161
(58) Field of Classification Search .................. 320/107, 320/125, 132, 137, 161; 429/482, 525, 90, 429/91
See application file for complete search history.

(56) References Cited

U.S. PATENT DOCUMENTS

| 7,524,584 B2 * | 4/2009 | Barker et al. | 429/231.5 |
| 2006/0222936 A1 * | 10/2006 | Yamaguchi et al. | 429/145 |
| 2007/0009800 A1 * | 1/2007 | Barker et al. | 429/231.9 |

* cited by examiner

*Primary Examiner* — Edward Tso
(74) *Attorney, Agent, or Firm* — Edwin Tarver; Lauson & Tarver LLP

(57) ABSTRACT

A method of developing an optimum a lithium battery charging algorithm is conducted by providing a salt dissolved in solvent permitting lithium ions to leave a cathode in large format battery cells. Charge and discharge are then measured under different C-rate conditions. Using the cathode material phase transformations to ascertain a differential curve, peaks in the differential curve are observed with all data plotted against dV/dt and V, where V represents voltage and t represents time. Areas in voltage ranges are then observed where the rate of increase is higher than in other areas. By varying the charging current, an optimum charging voltage can be ascertained and maintained.

1 Claim, No Drawings

CHARGING ALGORITHM FOR LITHIUM BATTERIES

This application claims the benefit of the filing date of provisional application No. 61/222,372, filed on Jul. 1, 2009.

BACKGROUND

The present invention relates to the field of battery technology; and more particularly to a battery charging algorithm for lithium polymer batteries.

SUMMARY

There are two major charging procedures for charging lithium polymer batteries. One method is to charge at a constant current. When a target voltage is reached the current is kept constant until the current which normally decreases, rises to a certain value. Another method of charging is step charging with a constant current. In this method, the current is stopped at time intervals until the target voltage is reached. It has been observed that lithium ion batteries are very sensitive to charge rates, temperatures, thermodynamics and kinetics of all components, electrodes and battery chemistry. A novel method reveals a specific algorithm to efficiently charge lithium batteries by adjusting battery voltage and current output to match the individual chemistry of lithium batteries.

DESCRIPTION

During charge lithium ions leave the structure of the cathode material and ionic movement is assisted by a salt LiPF6 dissolved in EC/DMC solvent. If the charging rate is too high the total capacity achieved is lowered, said lowering depending on the C-rate.

Large format prismatic cells with a capacity of 100 Ah are used to perform a series of experiments. The charge and discharge are performed under different C-rate conditions. During charging, cathode material undergoes different phase transformations and a differential curve is produced. Several peaks can be observed with all data plotted against dV/dt and V, where V represents voltage and t time.

During phase transformations it can be observed that within a particular voltage range the rate of increase in voltage is high and in some areas it is minimal. This phenomenon is introduced to model a charging algorithm wherein the system is designed so that the charging current is varied according to cell voltage within the range of 3 to 4.2V. Using the method, battery cycle life is enhanced and the capacity percentage increases compared to conventional charging procedures. Another feature of this type of charging procedure is that it results in less temperature rise.

What is claimed is:

1. An improved method of deriving a lithium battery charging algorithm comprising the steps of:
   a. providing a salt LiPF6 dissolved in EC/DMC solvent to allow lithium ions to leave the structure of a cathode material in large format prismatic cells with a capacity of 100 Ah;
   b. measuring charge and discharge rates under different C-rate conditions;
   c. using cathode material phase transformations to ascertain a differential curve;
   d. observing peaks in the differential curve with all data plotted against dV/dt and V, where V represents voltage and t represents time;
   e. observing areas in a voltage range where the rate of increase is higher than in other areas; and
   f. varying the charging current according to cell voltage within the range of 3 to 4.2V.

\* \* \* \* \*